United States Patent
Murata et al.

(10) Patent No.: US 6,201,570 B1
(45) Date of Patent: Mar. 13, 2001

(54) DIGITAL TELEVISION CAMERA APPARATUS PROVIDED WITH CAMERA HEAD UNIT AND CAMERA CONTROL UNIT, INDEPENDENTLY

(75) Inventors: Nobuo Murata, Musashino; Atsushi Miyashita, Tokorozawa, both of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/926,435

(22) Filed: Sep. 10, 1997

(30) Foreign Application Priority Data

Sep. 13, 1996 (JP) .................................................. 8-243490
Sep. 24, 1996 (JP) .................................................. 8-251852

(51) Int. Cl.[7] .............................. H04N 5/232; H04N 9/73
(52) U.S. Cl. ......................... 348/212; 348/223; 348/239; 348/26; 348/592
(58) Field of Search .................................. 348/211, 212, 348/222, 223, 225, 576, 592, 649, 652, 71, 625, 630, 26, 239, 266, 272, 273, 20, 30, 722, 207, 593, 598, 601; 382/190

(56) References Cited

U.S. PATENT DOCUMENTS

| | | | |
|---|---|---|---|
| 4,306,247 | * 12/1981 | Tomimoto et al. ................... | 358/28 |
| 5,313,275 | * 5/1994 | Daly et al. ............................ | 348/592 |
| 5,381,185 | * 1/1995 | Ohki et al. ............................ | 348/652 |
| 5,512,946 | * 4/1996 | Murata et al. ....................... | 348/222 |
| 5,650,825 | * 7/1997 | Naimpally et al. .................. | 348/465 |
| 5,689,575 | * 11/1997 | Sako et al. ........................... | 382/190 |
| 5,901,244 | * 5/1999 | Souma et al. ....................... | 382/190 |
| 5,910,825 | * 6/1999 | Takeuchi ............................. | 348/722 |
| 5,929,934 | * 7/1999 | Nakasaka et al. .................. | 348/593 |
| 5,986,718 | * 11/1999 | Barwacz et al. .................... | 348/592 |
| 6,009,305 | * 6/1999 | Murata ................................ | 348/212 |
| 6,122,014 | * 11/1999 | Panusopone et al. .............. | 348/592 |

* cited by examiner

Primary Examiner—Wendy Garber
Assistant Examiner—Jacqueline Wilson
(74) Attorney, Agent, or Firm—Antonelli, Terry, Stout & Kraus, LLP

(57) ABSTRACT

A camera head unit generates a digital video signal, a transmission unit transmits the digital video signal from the camera head unit, and a camera control unit processes the digital video signal transmitted from the camera head unit through the transmission unit. The camera head unit includes a replacing unit for replacing the least significant bit data of the digital video signal to be transmitted from the camera head unit to the camera control unit with another signal data to thereby produce a replacement video signal which is transmitted to the transmission unit. The camera control unit includes an extraction unit for extracting the least significant bit data from the replacement video signal transmitted from the camera head unit through the transmission unit to thereby produce the above-mentioned another signal data.

1 Claim, 8 Drawing Sheets

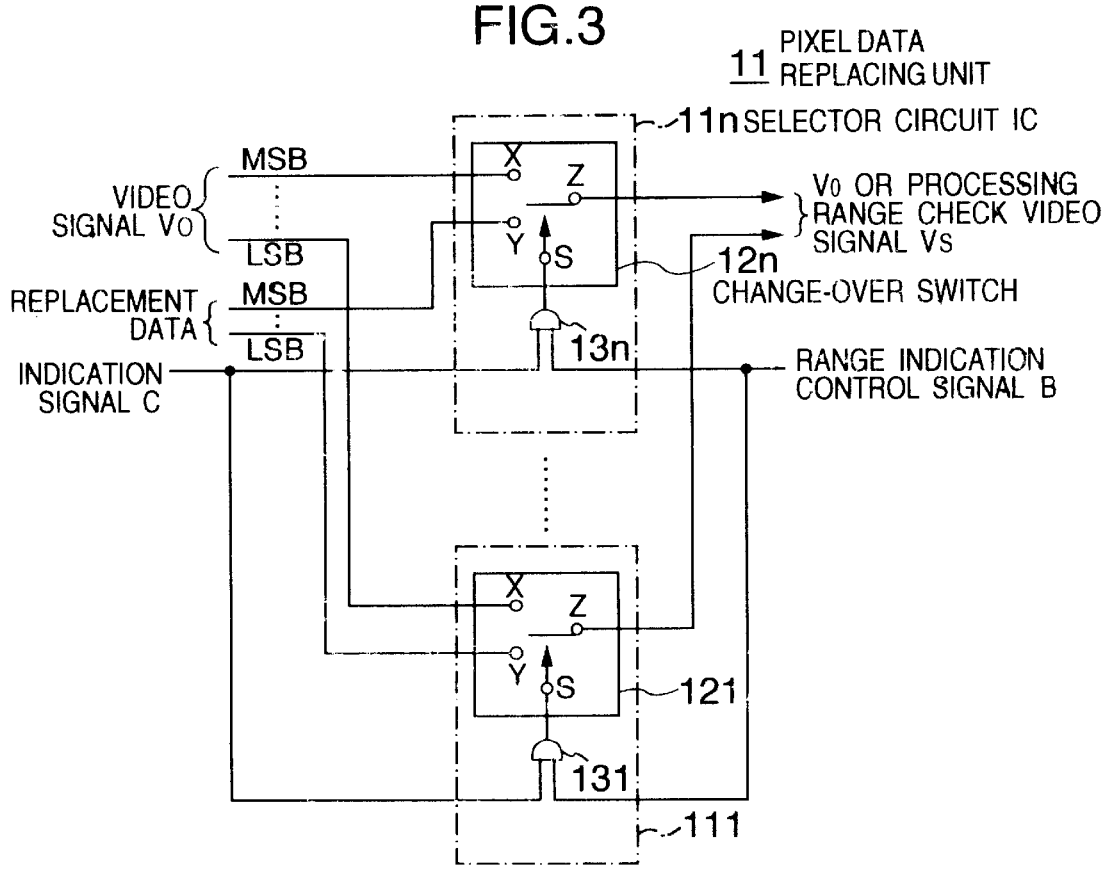
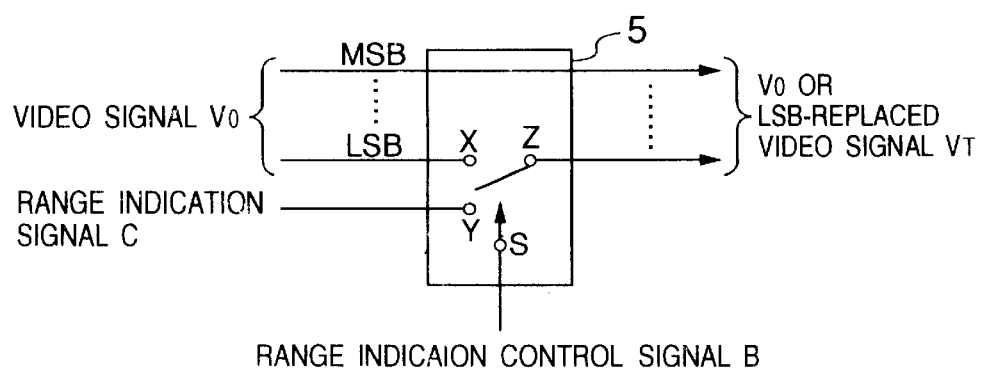

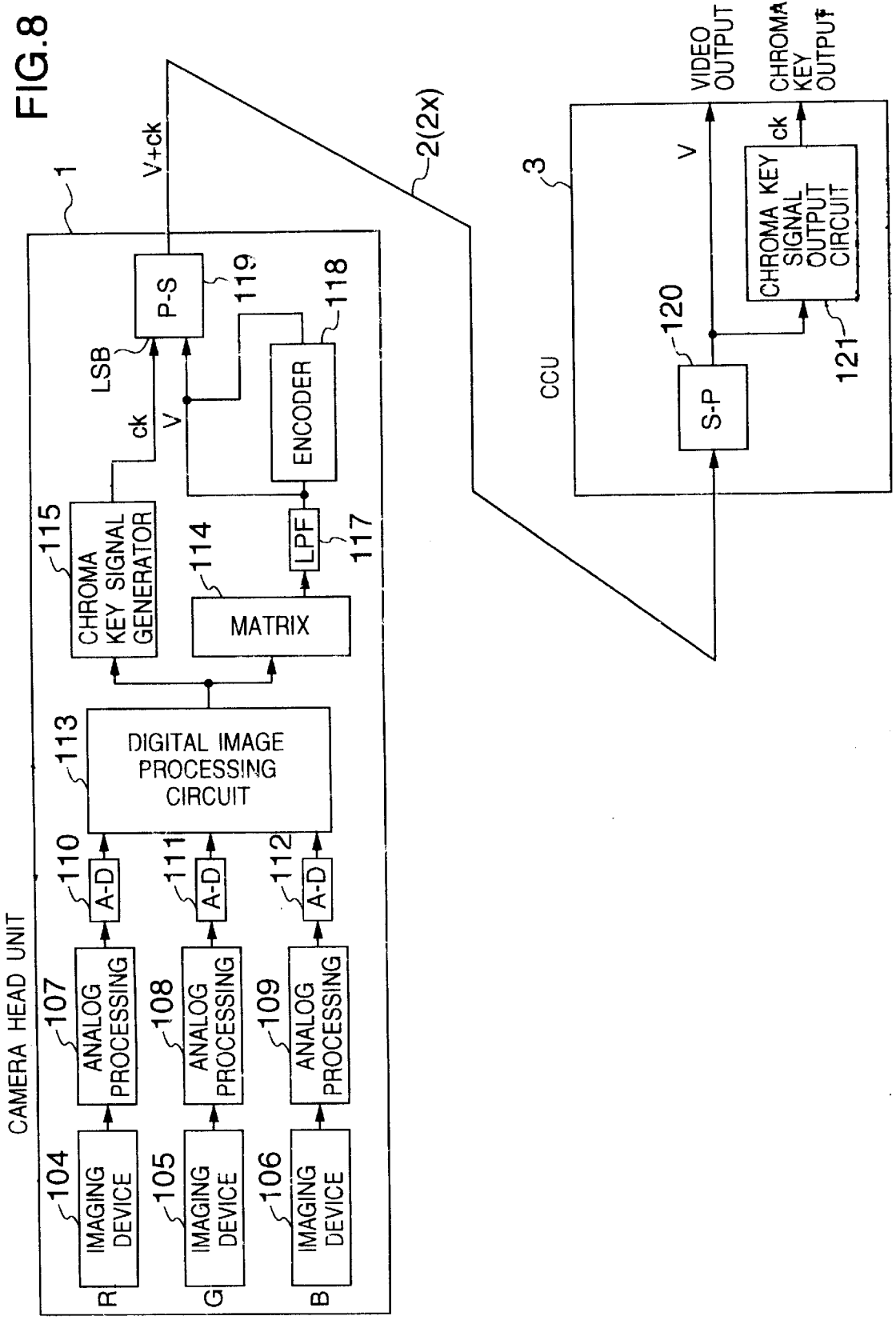

BLUE BACKGROUND
HUMAN BEING

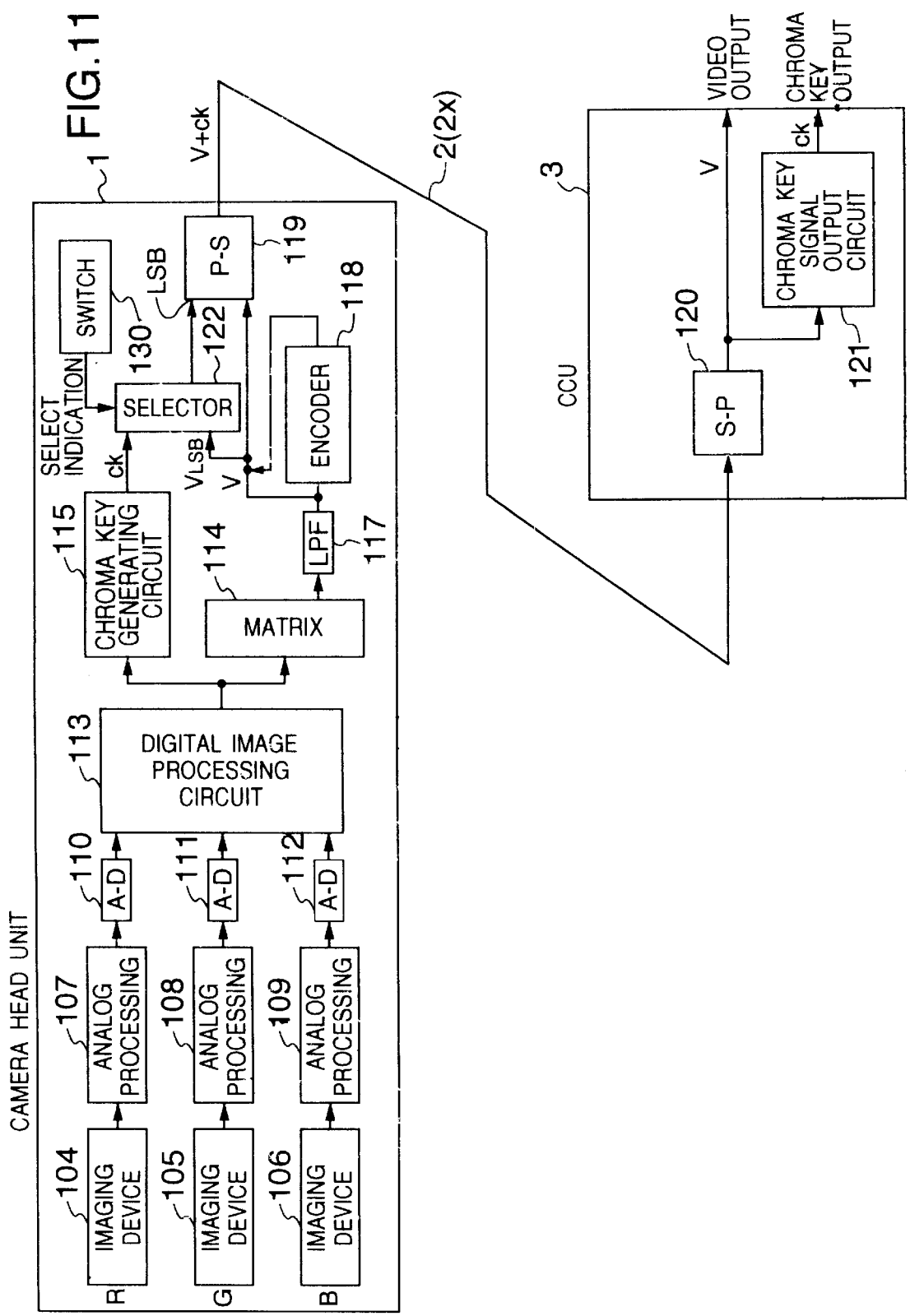

FIG.12

| | | RANGE INDICATION CONTROL SIGNAL B | DISPLAYED IMAGE |
|---|---|---|---|
| PRIOR ART | OUTPUT SIGNAL Vo, Vs OF REPLACING UNIT 11 | LOW | Vo |
| | | HIGH | 104 Vs |
| | OUTPUT SIGNAL Vo, Vs OF CCU PROCESSING UNIT 7 (MAIN & MONITOR VIDEO SIGNALS) | LOW | Vo |
| | | HIGH | 104 Vs |
| PRESENT INVENTION | OUTPUT SIGNAL Vo, VT OF REPLACING UNIT 5 | LOW | Vo |
| | | HIGH | VT |
| | OUTPUT SIGNAL Vo, VT OF CCU PROCESSING UNIT 7 (MAIN VIDEO SIGNAL) | LOW | Vo |
| | | HIGH | VT |
| | OUTPUT SIGNAL Vo, VTS OF REPLACING UNIT 9 (MONITOR VIDEO SIGNAL) | LOW | Vo |
| | | HIGH | 104 VTS |

DIGITAL TELEVISION CAMERA APPARATUS PROVIDED WITH CAMERA HEAD UNIT AND CAMERA CONTROL UNIT, INDEPENDENTLY

BACKGROUND OF THE INVENTION

The present invention relates to a television camera apparatus of digital type provided with a camera head and a camera control unit independently, or more in particular to signal transmission between the camera head unit and the camera control unit of a digital television camera apparatus having the image processing function such as flesh tone contour processing, the highlight processing and the chroma key processing.

A high-quality television camera apparatus used for professional use in broadcast stations and the like is generally configured of a camera head unit (hereinafter referred to as the head unit) and a camera control unit (hereinafter referred to as the CCU) independent of each other and coupled to each other through a cable.

In this conventional television camera, the image information obtained by imaging an object is generally processed by an analog method. In recent years, however, a camera system of digital processing type has come to be widely used. In such a camera system, a television camera in which the transmission between the head unit and the CCU is digitally processed has begun to find applications.

A typical example of the image processing in such a television camera is what is called the flesh tone contour processing (hereinafter referred to as the FTC processing) in which the degree of contour emphasis of only a specific hue portion of the picture such as the flesh tone portion of the human being, for example, is controlled independently.

The FTC processing is the processing for controlling the degree of contour emphasis correction of the image portion of the human flesh color. Since an excessive degree of contour emphasis correction would highlight wrinkles, the process is executed normally for weakening the contour emphasis degree.

This FTC processing is disclosed, for example, in JP-A-7-143510, U.S. Pat. No. 4,506,293, etc. (prior art (1)).

It is desirable to display a processed image on a monitor screen or the like to check whether the FTC process designated by the operator is correctly performed as to the image portion intended by the operator, i.e., the hue portion intended by the operator. For this purpose, the video signal that has been subjected to the FTC processing is transmitted from the head unit to the CCU and displayed on a color monitor screen or the like. In this case, when the video signal subjected to the FTC processing is displayed as it is on the color monitor screen or the like, however, it is difficult to check which image portion has been subjected to the FTC processing. In view of this, the brightness of the image subjected to the FTC processing is replaced by a predetermined level of brightness to obtain a video signal indicating an image range subjected to the FTC processing. The FTC processed image portion of the original video signal is replaced by this video signal to obtain a video signal for checking the FTC processing range, that is, an FTC processing range check video signal. Alternatively, the image portion subjected to the FTC processing (FTC processed image portion) is superimposed by a signal representing a white or black frame which surrounds the image portion subjected to the FTC processing (i.e., the video signal indicating an image range subjected to the FTC processing) to obtain the FTC processing range check video signal. Such a FTC processing range check video signal is displayed on a screen in order to facilitate such a checking of an image portion subjected to the FTC processing. FIG. 1 shows an example of the FTC processing range check video signal displayed on a monitor screen 100 in which the portion of a human image 102 subjected to the FTC processing is surrounded by a black frame 104. In this case, the image portion of the black frame represents the image produced by the video signal indicating the FTC processed image range, while the entire image added with the black frame represents the image produced by the FTC processing range check video signal.

The prior art (1) described above discloses no method of transmitting the video signal for checking the FTC processing range (FTC processing range check video signal) to the CCU.

In the prior art, at the time of checking the FTC processing image, the video signal added with the video signal indicating the FTC processing range (i.e., the FTC processing range check video signal) is transmitted through a main video line from the head unit to the CCU, in which case the FTC processing range check video signal is transmitted in place of the normal video signal added with no indication signal.

FIG. 2 shows an example configuration of a conventional television camera apparatus using such a transmission method, which is realized by SK-2000 of Hitachi Denshi Ltd. (prior art (2)), for example.

Such an apparatus has a general configuration including a head unit 1, a transmission unit 2 and a CCU 3.

The head unit 1 includes a head processing unit 4 with a TV camera and a pixel data replacing unit 11. The whole head unit is held by a pedestal or a dolly not shown through a table and constitutes a body of the TV camera.

The transmission unit 2, on the other hand, includes two parts coupled through a transmission cable having a main video line 2x and data lines 2a, 2b. One of the parts is included in the head unit 1 and the other part included in the CCU 3, both of which are responsible for data transmission between the head unit 1 and the CCU 3.

Further, the CCU 3 is configured of a CCU processing unit 7, a controller 10 and the other part of the transmission unit 2.

The controller 10 outputs a processing variable control signal A and a processing range indication control signal B making up a video processing control signal. These signals are transmitted to the head unit 1 through the transmission unit 2.

The processing variable control signal A is formed by two kinds of signals having variable values, that is, a signal A1 for setting the hue to be subjected to the FTC processing and a signal A2 indicating the degree of flesh tone contour correction (hereinafter referred to as the contour level), i.e. the degree of the FTC processing. The processing range indication control signal B is an on/off signal for controlling whether or not a video signal indicating the position and the range of the hue subjected to the FTC processing (FTC processing range) on the image is to be added to the original video signal.

The operation relating to the control signals for the FTC processing according to the above-mentioned prior art will be described below.

The controller 10 includes at least two volume knobs 10a1, 10a2 for generating a hue setting signal $A_1$ and a contour level setting signal $A_2$, respectively, making up the processing variable control signal A, and a range indication switch 10b for turning on/off the processing range indication control signal B.

These signals A, B are both generated by human operation, and therefore are signals substantially similar to a DC signal exhibiting a considerable temporal delay. The hue setting signal $A_1$ and the contour level setting signal $A_2$ are voltage signals continuously variable from 0 to 5 V, for example. The processing range indication control signal B, on the other hand, is a binary signal assuming values of a low level of 0 V and a high level of 5 V, for example. These control signals A, B are transmitted to the head unit 1 through the transmission unit 2. The processing variable control signal A is input to the head processing unit 4, and the range indication control signal B is input to the pixel data replacing unit 11.

First, the head processing unit 4 determines a hue to be subjected to the FTC processing in accordance with the voltage value of the hue setting signal $A_1$. Then, in accordance with the voltage value of the contour level setting signal $A_2$, the contour level of the particular hue is determined. These signals are used to subject the video signal to a predetermined flesh tone contour processing, and to produce a video signal $V_O$ as a FTC-processed video signal. The video signal $V_O$ is a multi-bit line scan signal equivalent to the D-1 signal having a 10-bit parallel digital recording format, for example.

The video signal $V_O$ output from the head processing unit 4 is transmitted through the pixel data replacing unit 11 and the main video line of the transmission unit 2 to the CCU 3 and is input to the CCU processing unit 7. This signal is output as the main video signal and the operator video signal. The operator video signal is displayed on the monitor.

The operation of the pixel data replacing unit 11 is controlled by the processing range indication control signal B. When the signal B is at a low level, for example, the replacing unit 11 operates in a manner that the video signal $V_O$ from the head processing unit 4 is output as it is. When the range indication control signal B is at a high level, on the other hand, the replacing unit 11 operates in a manner that an indication signal C indicating the position and the range of the video signal $V_O$ output from the head processing unit 4 associated with the hue to be subjected to the FTC processing is used as a switching signal (key signal) such that the video signal indicating the FTC processed image range is synthesized with the video signal $V_O$ from the head processing unit 4 and output as the FTC processing range check video signal $V_s$ (see FIG. 12). In this case, the replacing unit 11 serves in a manner that the brightness level of each pixel of the video signal $V_O$ associated with the high-level of the indication signal C is replaced with a predetermined fixed value, and the video signal thus partially replaced by the video signal indicating the FTC processed image range is output as a video signal Vs for checking the processing range (i.e., an FTC processing range check video signal).

This pixel data replacing unit 11 is easily configured by use of a plurality of known selector circuit ICs such as model 74LS157 in parallel.

Specifically, a change-over switch of multi-point double-contact type is formed by combining these ICs as shown in FIG. 3. One of the two inputs X and Y including a plurality of bits is selected according to the logical level of the control input S, and the input thus selected is output.

More specifically, in FIG. 3, the pixel data replacing unit 11 includes n selector circuit ICs 111 to 11n. Each selector circuit IC has an AND gate 131 to 13n and a change-over switch 121 to 12n. The number n of the selector circuit ICs is ten when the video signal $V_O$ is composed of 10-bit parallel digital data. Each of the change-over switches 121 to 12n of the selector circuit ICs 111 to 11a includes a terminal X supplied with a corresponding bit of the video signal $V_O$ (that is, the input terminals X of the change-over switches 121 to 12n are supplied with MSB (most significant bit) to LSB (least significant bit), respectively, of the video signal $V_O$), a terminal Y supplied with a corresponding bit of a replacement data (that is, the input terminals Y of the change-over switches 121 to 12n are supplied with MSB to LSB, respectively, of the replacement data), a terminal Z for outputting a corresponding bit of the video signal $V_O$ or the processing range check video signal signal $V_s$ (that is, the output terminals Z of the change-over switches 121 to 12n output MSB to LSB, respectively of the signal $V_O$ or $V_s$, as the case may be), and a control input terminal S. Each of the AND gates 131 to 13n of the selector circuit ICs 111 to 11n is supplied with the indication signal C and the processing range indication control signal B, and applies the output thereof to the terminal S of the corresponding one of the change-over switches 121 to 12n to thereby control the corresponding one of the change-over switches 121 to 12n.

The replacement data is a ten-bit digital data, for example, corresponding to the brightness level of 100% in the case of displaying the video signal indicating the FTC processed image range of the processing range check video signal $V_s$ with the maximum brightness. In the case where the replacement data is displayed in a black frame, in contrast, is a ten-bit digital data corresponding to the minimum brightness level. The description that follows concerns the case in which the former data is used as the replacement data.

In this configuration, assume that the indication signal C is at high level and that the range indication control signal B is at high level. Each of the AND gates 131 to 13n produces a high-level output, so that the output terminal Z of each of the change-over switches 121 to 12n is turned to the input terminal Y and the ten-bit replacement data is output as the video signal indicating the FTC processed image range of the processing range check video signal $V_s$. In the case where at least one of the indication signal C and the range indication control signal B is at low level, on the other hand, each of the AND gates 131 to 13n outputs a low-level signal, so that the output terminal Z of each of the change-over switches 121 to 12n is turned to the input terminal X and the ten-bit video signal $V_O$ is output as it is.

As long as the range indication switch 10b of the controller 10 remains off and the range indication control signal B is at low level, therefore, the video signal $V_O$ output from the head processing unit 4 is transmitted as it is to the CCU 3 through the main video line 2x of the transmission unit 2, and output as a main video signal. At the same time, it is displayed on a monitor, thus setting up the system ready for on-air operation.

When the operator manipulates the knobs 10a1 and 10a2 of the controller 10 and makes such adjustments as setting the hue or the contour level, the voltage value of the processing variable control signal A (A1, A2) output from the controller 10 is changed.

The voltage value of the processing variable control signal A is sent to the head processing unit 4 through the transmission unit 2. The hue and the contour level are changed in accordance with the operation of the controller 10. As a result, the required FTC processing can be accomplished.

On the other hand, assume that the operator desirous of checking the range subjected to FTC processing and has turned on the range indication switch 10b of the controller 10. The range indication control signal B output from the controller 10 rises to high level. This signal is applied to the AND gates 131 to 13n of the pixel data replacing unit 11 of the head unit 1 through the transmission unit 2. Consequently, as long as the signal B is at high level, the pixel data replacing unit 11 replaces the video signal $V_0$ with a signal of predetermined level having a brightness of 100% by pixel during the period when the indication signal C from the head processing unit 4 remains at high level (i.e., the signal portion associated with the hue to be processed), whereby the processing range check video signal $V_s$ is produced (see FIG. 12).

In the process, the voltage level of the indication signal C output from the head processing unit 4 is as follows, for example. Specifically, the indication signal C assumes a high level of, say, 5 V in the range of the hue subjected to the FTC processing, and assumes a low level of, say, 0 V out of the range subjected to the FTC processing. The indication signal C thus has a signal format of a binary line scan signal.

By way of reference, the hue can be determined from the ratio of the levels between the R, G and B signals.

Therefore, the head processing unit 4 delivers the indication signal C with a voltage of 5 V only when the levels of the R, G and B signals are in the desired ratio corresponding to the hue set by the signal A.

As a result, the video signal $V_S$ replaced with a signal having a maximum brightness level in the range subjected to the FTC processing is sent to the CCU 3 through the main video line 2x of the transmission unit 2 of the head unit 1, and output as a main video signal and a operator video signal. A portion of the picture having a uniform maximum brightness subjected to the FTC processing is displayed on the monitor, thereby facilitating the checking of the range to be processed.

With the above-mentioned configuration, the procedure for manipulating the knobs 10a1, 10a2 and the switch 10b of the controller 10 by the operator will be explained.
(1) The range indication switch 10b is turned on and the flesh tone portion of a human being which is the currently-set range subjected to the FTC processing is displayed on the monitor. Specifically, the interior of the frame 104' which is the currently-set range is displayed with maximum brightness as shown in FIG. 1.
(2) The hue setting knob 10a1 is manipulated to adjust the flesh tone which is a hue subjected to the FTC proessing. Thus, an image of the frame 104' changes to an image of a frame 104 which corresponds to the hue thus adjusted so that the interior of the frame 104 is displayed with maximum brightness.
(3) Once the image area in the frame 104, i.e., the range subjected to the FTC processing is checked, the switch 10b is turned off and the interior of the frame 104 is restored to the original brightness level.
(4) The knob 10a2 for setting the contour level is manipulated and the contour level is adjusted while watching the image within the range subjected to the FTC processing.

The FTC processing is accomplished in this way.

Now, explanation will be made about a prior art (3) in which a chroma key signal is transmitted from the head unit to the CCU.

In many cases, the various video signals in the television camera apparatus are normally processed by the head unit and the signals thus processed are transmitted to the CCU.

In the process, the schemes for transmitting signals between the camera head unit and the CCU include the RGB scheme for transmitting the video signal in the form of R (red), G (green) and B (blue) signals directly, the brightness/color difference scheme in which the video signal is transmitted by being converted into the luminance (Y) signal and the color difference signal, and the composite scheme for transmitting the luminance signal and the color signal by being converted into a composite color signal (composite signal).

In recent years, a television camera apparatus for transmitting the video signal in digital signal format has come to be used in order to suppress the deterioration of the signal-to-noise ratio (S/N) and the waveform characteristics in the transmission unit between the camera head unit and the CCU. In the process, the transmission rate (transmission speed) of the digital signal is preferably maintained as low as possible from the viewpoints of cost, power consumption and stability.

Among the various transmission schemes described above, the transmission rate is highest for the RGB scheme, followed by the brightness/color difference scheme in which the bandwidth of the color difference signal is reduced to about one half that of the luminance signal for a reduced transmission rate. The transmission rate can be reduced most in the composite scheme.

These broadcasting television camera apparatuses sometimes require a specification corresponding to the chroma key technique as a method of image processing. In such a case, a configuration is necessary in which a chroma key used for image synthesis by insertion from the CCU can be produced together with the video signal.

In the prior art (2) described above, one of the main video signal and the FTC processing range check video signal is alternatively transmitted to the CCU through the main video line. The checking of the FTC processing can not be performed, therefore, during the period when the television camera apparatus is operated in an on-air state and so the main video signal is transmitted through the main video line.

Specifically, in the case where the FTC processing range check video signal is output from the camera head unit to the CCU for checking the FTC processing during the on-air operation of the camera apparatus, the main video signal and the monitor video signal output from the CCU are both undesirably the FTC processing range check video signal. As a result the FTC processing range check video signal is output as the main video signal from the television camera apparatus. Thus, during the on-air operation, the FTC processing range check video signal cannot be transmitted from the head unit, and therefore the checking of the range subjected to the FTC processing can not be performed.

In the prior art (2), therefore, the processing range can be checked only at the time of set-up of the camera before the on-air operation.

In a method proposed to solve this problem, a dedicated cable or the like for transmitting only an indication signal from the head unit to the CCU may be laid separately so that the indication signal C is transmitted through this dedicated cable to the CCU to produce the FTC processing range check video signal in the CCU. In this method, however, the head unit and the CCU are sometimes installed several hundred meters apart from each other. The provision of such a dedicated cable, therefore, is not considered to have a practical value as it requires considerable labor and cost.

The readjustment of the FTC processing and the like is indispensable even during the on-air operation. In recording outdoor sports or other similar events, for example, the change in the imaging conditions due to the change in weather or with time is unavoidable. In such a case, the readjustment of the FTC processing and the like is a must even during the on-air operation in order to maintain the image quality.

In the prior art (3) described above, no consideration is given to the compatibility between a specification corresponding to the chroma key technique of the television camera apparatus and such factors as cost, power consumption and stability. The problem, therefore, is that employment of the RGB scheme not satisfactory in stability, power consumption or cost is unavoidable as a television camera apparatus requiring a high image quality for broadcasting.

Specifically, if a chroma key signal of high accuracy is to be produced, wide-band R, G, B signals are required as a video signal which must be transmitted from the head unit to the CCU. In the prior art (3), the high transmission rate of the video signal poses the problem of low stability, large power consumption and high cost on the one hand, and makes it unavoidable to employ the RGB scheme liable to be limited in the cable length on the other.

In an alternative method proposed, the chroma key signal is generated from the R, G, B signals at the head unit, and the R, G, B signals are converted into a composite signal, for example, with the resulting chroma key signal and the composite signal being transmitted to the CCU. In such a case, however, if the chroma key signal is to be transmitted to the CCU without suspending the on-air video signal (composite signal), a dedicated cable or the like separate from the main video line is required for transmitting the chroma key signal from the head unit to the CCU. Like the prior art (2), therefore, this technique is not considered to have any practical value due to its high cost.

As described above, in a conventional television camera apparatus comprising a camera head unit for generating a digital video signal, a transmission unit for transmitting the digital video signal from the camera head unit and a camera control unit (CCU) for processing the digital video signal transmitted from the camera head unit through the transmission unit, in order to transmit an image processing signal such as a video signal indicating the FTC processed image range or a chroma key signal to the CCU without suspending the on-air video signal, a cable dedicated to the image processing signal is required to be provided separate from the main video line, which has no practical value due to its high cost.

SUMMARY OF THE INVENTION

Accordingly, an object of the present invention is to provide a television camera apparatus comprising a camera head unit for generating a digital video signal, a transmission unit for transmitting the digital video signal from the camera head unit, and a camera control unit (CCU) for processing the digital video signal transmitted from the camera head unit through the transmission unit, wherein an image processing signal such as an indication signal indicating the FTC processed image range or a chroma key signal is transmitted from the head unit to the CCU together with the video signal without suspending the on-air video signal and without any provision of a dedicated cable or the like separate from the main video line.

Another object of the invention is to provide a television camera apparatus for transmitting an image processing signal such as an indication signal indicating the FTC processed image range together with the on-air video signal from the head unit to the CCU through the main video line, wherein the image processing signal can be monitored without suspending the on-air video signal.

Still another object of the present invention is to provide a television camera apparatus of high-quality digital type stable in operation and low in power consumption, in which an image processing signal such as the chroma key signal is transmitted from the head unit to the CCU through the main video line together with the on-air video signal.

In order to achieve the above-mentioned objects, according to one aspect of the invention, there is provided a television camera apparatus comprising a camera head unit for generating a digital video signal, a transmission unit for transmitting the digital video signal from the camera head unit and a camera control unit for processing the digital video signal transmitted from the camera head unit through the transmission unit, wherein the camera head unit includes a replacing unit for replacing the least-significant bit data of the digital video signal to be transmitted from the camera head unit to the camera control unit with another signal data to obtain a replacement video signal and transmitting the replacement video signal to the transmission unit, and the camera control unit includes an extraction unit for extracting the least significant bit from the replacement video signal transmitted from the camera head unit through the transmission unit and obtaining said another signal data.

As described above, according to the present invention, the LSB of the video signal is replaced with another signal other than the video signal to produce a replacement video signal, which is transmitted from the camera head unit through the transmission unit to the camera control unit (CCU). The another signal thus transmitted together with the video signal to the CCU is separated from the video signal in the replacement signal at the CCU, and thus, the another signal can be processed while at the same time producing the video signal. As a result, the CCU can produce a video signal even when receiving the another signal, thereby obviating the problem of suspending the video signal. The video signal obtained in the CCU is one whose only the LSB is replaced by another signal and therefore poses no problem of the deterioration of the reproduced image quality.

Further, the second signal can be transmitted to the CCU at the same time as the video signal through the main video line of the transmission unit, and therefore the need is eliminated of another line for transmitting the second signal. In this way, the problem of the prior art (2) described above is solved.

In an example of the present invention, the television camera apparatus further comprises a control signal generator for generating a control signal, wherein the replacing unit replaces the the least-significant bit data of the digital video signal with another signal data in accordance with the control signal thereby to produce the replacement video signal.

The control signal generator can be configured of a switch, for example. The LSB of the video signal can thus be replaced with the another signal data in the camera head unit by turning on the switch. The another signal data can thus be extracted, processed and monitored in the CCU appropriately.

Assuming that the another signal is the one defining the range of the image subjected to the FTC or other processing in the camera head unit, the another signal can be extracted and processed in the CCU and the range of the image subjected to the image processing can be checked on the monitor without interrupting the video signal.

As described above, the on-air video signal and the processing range check video signal are produced in the CCU independently of each other, and therefore the FTC adjustment can be accomplished arbitrarily even during the on-air operation.

In this case, the LSB of the video signal transmitted to the CCU is replaced by the another signal, and the effect thereof may be a problem.

Normally, however, the digital video signal is configured to have tone information with a resolution of about ten bits. Even in the case where the least-significant bit data is replaced, therefore, the resulting effect is so minuscule that ordinary viewers substantially fail to notice it and therefore poses no problem.

In addition, the time required for FTC adjustment is normally so short that even a specialist rarely notices it. The effect of the adjustment therefore is substantially nil. Provision of the above-mentioned means can thus fully achieve the objects of the invention.

In another example of the invention, the camera head unit includes means for generating a digitized RGB video signals as the digitized video signal and a first converter for converting the format of the digitized RGB video signals into the format of luminance signal/color difference signal or the format of composite signal and applying the converted video signal to the replacing unit.

In this configuration, the camera head unit produces an image processing signal (such as a chroma key signal) from the RGB video signals, converts the RGB video signals into the format of the luminance signal/color difference signal or the format of the composite signal, replaces the LSB of the converted video signal with the image processing signal to obtain a replacement video signal, and transmits the replacement video signal to the CCU. Since the video signal is transmitted to the CCU not in the form of the RGB video signal format as described above, the above-mentioned problems of the prior art (3) relating to the stability, power consumption and cost of the television camera apparatus are obviated.

More specifically, in view of the fact that there is no need of transmitting the wide-band R, G, B signals to the CCU from the camera head unit to produce a chroma key signal unlike in the prior art (3), it is possible to employ the luminance/color difference transmission scheme or the composite signal transmission scheme with the bandwidth of the color difference signal narrower than that of the luminance signal in transmitting the video signal from the camera head unit to the CCU. The camera apparatus can thus be sufficiently reduced in cost and power consumption and can be improved in stability.

BRIEF DESCRIPTION OF THE DRAWINGS

FIG. 3 is a diagram showing an example configuration of a pixel data replacing unit of the television camera apparatus shown in FIG. 2;

FIG. 5 is a diagram showing an example configuration of a LSB replacing unit of the television camera apparatus of FIG. 4;

FIG. 8 is a block diagram showing an example configuration of a television camera apparatus having the chroma key processing function according to a second embodiment of the invention;

FIG. 11 is a block diagram showing an example configuration of a modification of a television camera apparatus having the chroma key processing function according to the invention; and FIG. 12 is a table showing the states of video signals depending on the range indication control signal in the arrangements of FIGS. 2 and 4.

DESCRIPTION OF THE PREFERRED EMBODIMENTS

A television camera apparatus according to an embodiment of the invention will be explained. First, description will be made of a television camera apparatus having the FTC processing function as an example of image processing according to a first embodiment of the invention with reference to the block diagram of FIG. 4 showing an example configuration.

Figure 4:
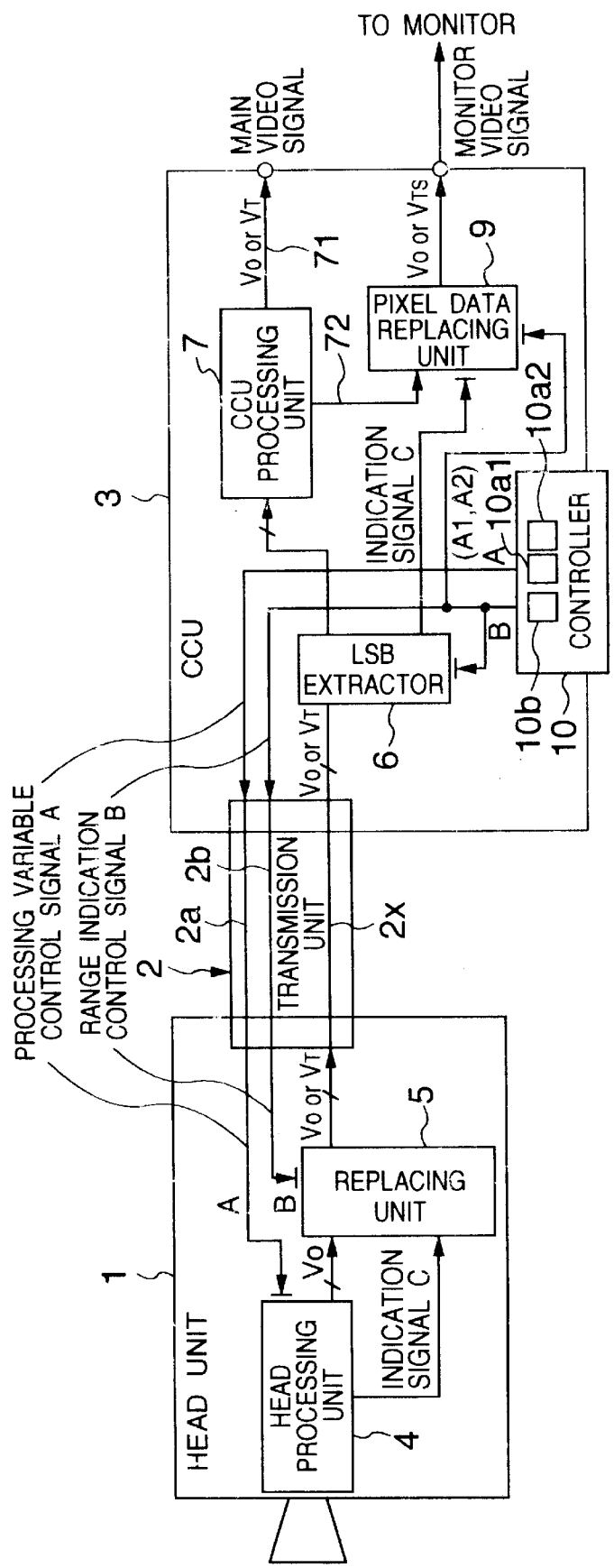
FIG. 4 is a block diagram showing an example configuration of a television camera apparatus having the flesh tone contour processing function according to an embodiment of the present invention.

In FIG. 4, numeral 5 designates a LSB replacing unit, numeral 6 a LSB extractor, and numeral 9 a pixel data replacing unit. In FIG. 4, those component parts designated by the same reference numerals as the corresponding component parts in FIG. 2 have the same functions, respectively, and will not be described any further.

Figure 1:
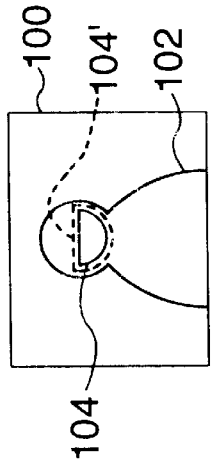
FIG. 1 is a diagram showing an example of a video signal added with a video signal indicating an FTC processed image range in which the image portion subjected to the flesh tone contour processing is surrounded by a black frame.
Figure 2:
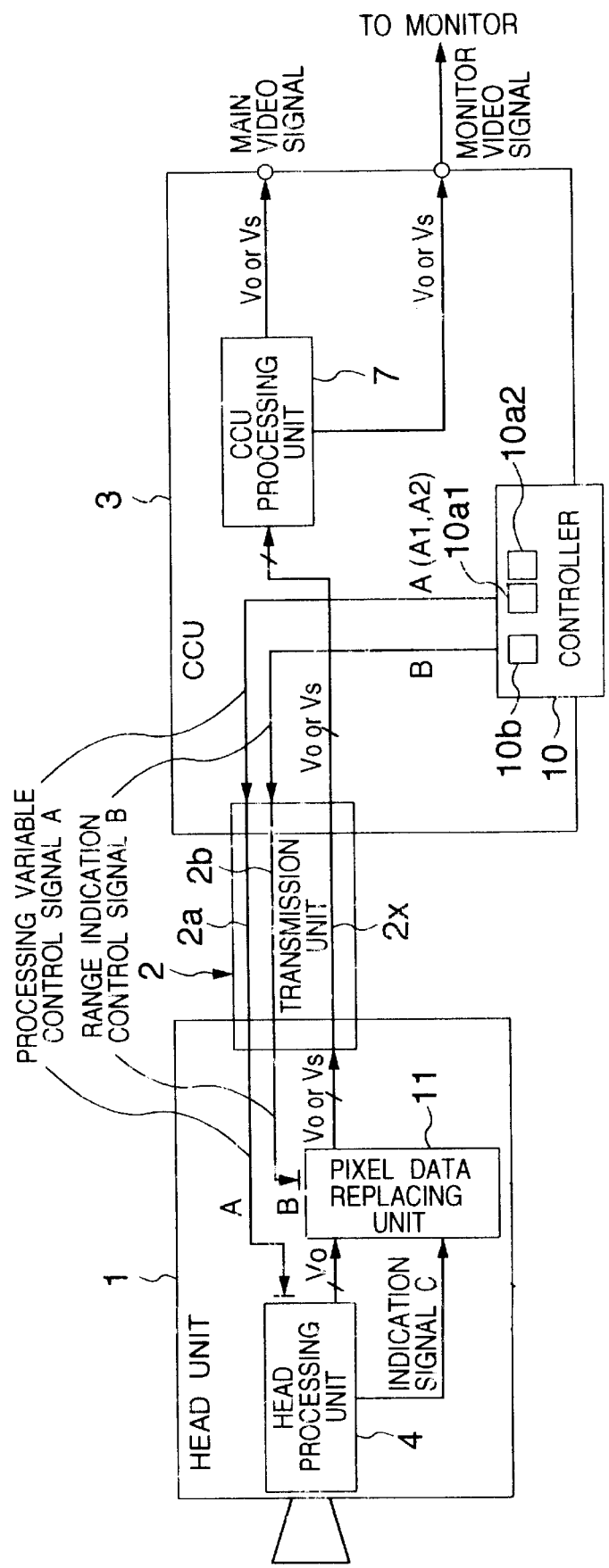
FIG. 2 is a block diagram showing a configuration of a conventional television camera apparatus having the flesh tone contour processing function.

Also, the general configuration of the apparatus is similar to that of the prior art shown in FIG. 2 and includes a head unit 1, a transmission unit 2 and a CCU 3.

As well known, the LSB is an abbreviation of the least significant bit indicating the least significant bit of data composed of multiple bits.

Now, the overall operation of the embodiment will be explained.

First, the head unit 1 constantly supplies a video signal V0 and an indication signal C to a LSB replacing unit 5 from a head processing unit 4. The indication signal C is a signal relating to an image and indicating an image range subjected to image processing, or more specifically, a signal indicating an image subjected to the FTC processing.

As a result, upon application thereto of a range indication control signal (control signal for controlling on/off of the indication of the FTC processed image range) B of high level, the LSB replacing unit 5 performs the operation of replacing the least-significant bit of the video signal V0 with a data having a predetermined level, for example, a data having the same level as the indication signal C in accordance with the indication signal C.

For this purpose, the head processing unit 4 outputs the indication signal C having a binary line scan signal format defining the hue range to be subjected to the FTC processing, which indication signal C is applied to the LSB replacing unit 5.

Thus, the LSB replacing unit, as described in detail later, selectively outputs the video signal $V_O$ and the LSB replacement video signal $V_T$, which is a signal obtained by replacing the least-significant bit of the video signal $V_O$ by the indication signal C, in accordance with the low and high level of the range indication control signal B, respectively.

The transmission unit 2 performs the operation of transmitting the video signal $V_O$ or $V_T$ supplied thereto through the LSB replacing unit 5 to the CCU 3 through the main video line 2$x$, while at the same time transmitting the various control signals A1, A2, B output from the controller 10 to the head unit 1.

The CCU 3, on the other hand, applies a processing variable control signal A ($A_1$, $A_2$) and the range indication control signal B from the controller 10 to the transmission unit 2, and further the range indication control signal B to the control terminal of the LSB extractor 6.

The video signal V0 or VT input to the CCU 3 through the transmission unit 2 is applied to the CCU processing unit 7 through the LSB extractor 6, whereby the CCU processing unit 7 outputs a main video signal 71 and an operator video signal 72.

The main video signal 71 is produced out of the CCU 3 directly, while the operator video signal 72 is output to an external monitor through the pixel data replacing unit 9.

At the same time, the indication signal C output from the LSB extractor 6 is applied to the control terminal of the pixel data replacing unit 9.

The processing variable control signal A ($A_1$, $A_2$) transmitted from the CCU 3 to the head unit 1 is applied to the adjustment control terminal of the head processing unit 4, and the range indication control signal B is applied to the control terminal of the LSB replacing unit 5.

Now, explanation will be made about the configuration and the operation of the LSB replacing unit 5 and the LSB extractor 6 making up component elements specific to the present embodiment.

First, the LSB replacing unit 5, as shown in FIG. 4, is arranged in the head unit 1 and constitutes a type of switching circuit which is supplied with the video signal $V_O$ and the indication signal C from the head processing unit 4 and operates in response to a control signal made up of the range indication control signal B supplied through the transmission unit 2 from the controller 10 in the CCU 3.

When the range indication control signal B is at low level, for example, the LSB replacing unit 5 directly outputs the video signal $V_O$ supplied thereto from the head processing unit 4. In the case where the range indication control signal B is at high level, on the other hand, the LSB of the video signal $V_O$ composed of a 10-bit digital data, for example, is replaced with the indication signal C and output as a LSB replacement video signal $V_T$.

The output of the LSB replacing unit 5 constitutes the video signal $V_O$ when the range indication control signal B is at low level, and constitutes the LSB replacement video signal $V_T$ when the range indication control signal B is at high level (see FIG. 12). These signals are transmitted through the main video line 2$x$ of the transmission unit 2 to the CCU 3 as shown and applied to the LSB extractor 6.

FIG. 5 shows a specific example of the LSB replacing unit 5. In FIG. 5, numeral 5 designates a switch circuit for switching the LSB signal representing the least significant bit of the video signal $V_O$. This switch circuit is configured of a selector circuit IC of a known model such as 74LS157. The switch circuit 5 includes a control input terminal S supplied with the control signal B, and has the function of selecting one of two inputs X, Y in accordance with the level of the control signal B applied to the control input terminal S and retrieving it at an output Z of the least significant bit LSB.

As shown, the least significant bit LSB of the video signal $V_O$ is applied to the input terminal X, the indication signal C is supplied to the input terminal Y, and the range indication control signal B is input to the control input terminal S. As a result, when the range indication control signal B is at low level, the least significant bit LSB of the video signal $V_O$ is retrieved directly from the output terminal Z, while when the range indication control signal B is at high level, the indication signal C is produced at the output terminal Z.

It is thus possible to easily provide a LSB replacing unit 5 in which the video signal $V_O$ or the video signal $V_T$ with the LSB replaced by the indication signal C is retrieved, respectively, according to the low or high level of the range indication control signal B.

When the range indication control signal B supplied from the controller 10 is at low level, for example, the LSB extractor 6 outputs the video signal $V_O$ input thereto as it is to the CCU processing unit 7. In the case where the control signal B is at high level, on the other hand, the LSB of the video signal $V_T$ is extracted and output the extracted LSB as the indication signal C while at the same time outputting the video signal $V_T$ as it is to the unit 7.

Figure 6:
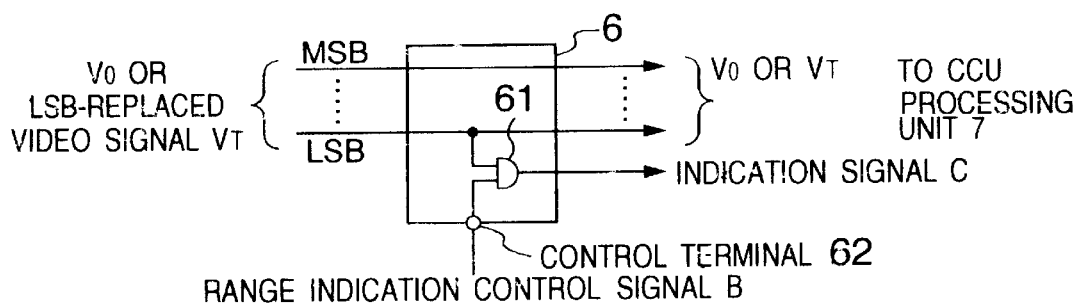
FIG. 6 is a diagram showing an example configuration of a LSB extractor of the television camera apparatus of FIG. 4.

An example configuration of the LSB extractor 6 is shown in FIG. 6. The LSB extractor 6 includes an AND gate 61 and has an input terminal thereof connected with the LSB of the main video line 2$x$ of the transmission unit 2. The LSB of the video signal $V_O$ or the LSB replacement video signal $V_T$ is input to the LSB extractor 6 from the transmission unit 2. The other input terminal of the AND gate 61 is impressed with the range indication control signal B through the control terminal 62. As described above, therefore, as long as the control signal B is at a low level, the video signal $V_O$ is applied from the transmission unit 2, so that the LSB extractor 6 outputs the video signal $V_O$ as it is to the CCU processing unit 7, while the AND gate 61 does not extract the LSB of the video signal $V_O$ and so does not produce the indication signal C. In the case where the control signal B is at a high level, in contrast, the video signal supplied from the transmission unit 2 is the LSB replacement video signal $V_T$, so that the LSB extractor 6 outputs the video signal $V_T$ as it is to the CCU processing unit 7 while at the same time the AND gate 61 extracts the LSB of the video signal $V_T$ and so outputs the indication signal C.

Incidentally, in the arrangement of FIG. 6, the AND gate 61 may be removed so that the LSBs of both the video signals $V_O$ and $V_T$ are extracted.

The video signal $V_O$ or $V_T$ providing an output of the LSB extractor 6, as shown in FIG. 4, is supplied to the CCU processing unit 7, while the indication signal C is similarly supplied to the pixel data replacing unit 9 as shown.

The pixel data replacing unit 9 is arranged in the CCU 3, and as shown, is supplied with the video signal $V_O$ or $V_T$ from the CCU processing unit 7 and the indication signal C making up an output of the LSB extractor 6. This pixel data replacing unit 9 has the same configuration as the conventional pixel data replacing unit 11 shown in FIG. 3 and therefore has the same function of producing a video signal for checking the processing range.

Figure 7A:
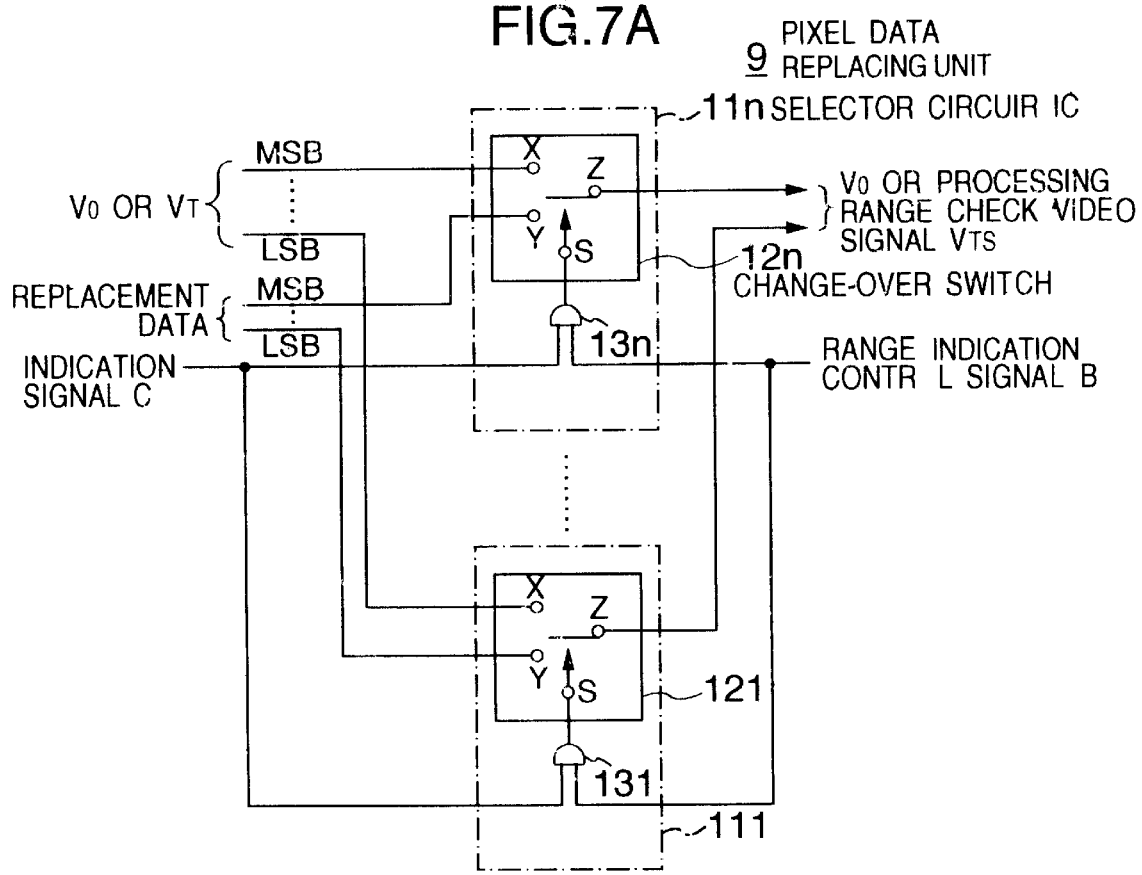
FIG. 7A is a diagram showing an example configuration of a pixel data replacing unit of the television camera apparatus of FIG. 4.

Specifically, FIG. 7A shows an example configuration of the pixel data replacing unit 11. Similarly to the configuration of FIG. 3, this pixel data replacing unit 11 includes n selector circuit ICs 111 to 11n. The input terminal X of each of the change-over switches 121 to 12n of the selector circuit ICs 111 to 11n is impressed with bits corresponding to the video signal $V_O$ or the LSB replacement video signal $V_T$, and the input terminal Y is supplied with bits corresponding to the replacement data. The other configuration is similar to that shown in FIG. 3.

The replacement data is a 10-bit digital data, for example, corresponding to the luminance level of 100% in the case where the image portion subjected to the FTC processing of the processing range check video signal $V_{TS}$ is displayed with maximum brightness. The replacement data is a 10-bit digital data corresponding to the minimum brightness level in the case where the FTC processed image portion of the processing range check video signal $V_{TS}$ is defined by a black frame. Description will be made here of the case in which a 10-bit digital data corresponding to the brightness level of 100% is used as the replacement data.

Figure 7B:
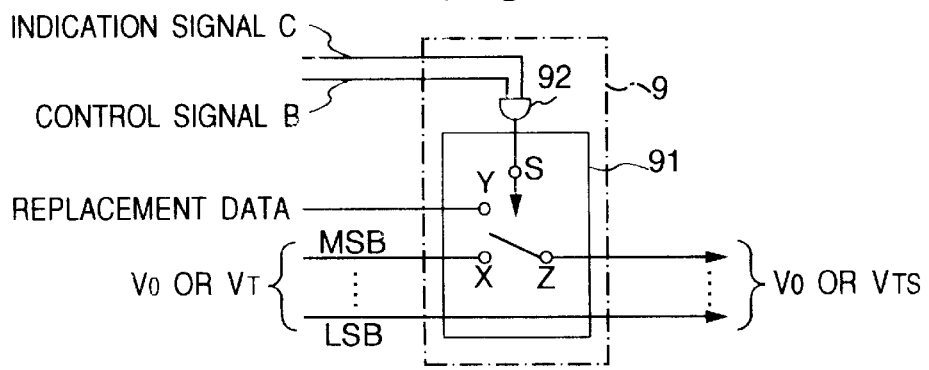
FIG. 7B is a diagram showing another example configuration of a pixel data replacing unit of the television camera apparatus of FIG. 4.

FIG. 7B shows another example configuration of the pixel data replacing unit 9. In this case, the MSB of the LSB-replaced video signal $V_T$ is replaced by a predetermined brightness level data of, say, "1". Specifically, the pixel data replacing unit 9 is configured of only one selector circuit IC of FIG. 7A, and the selector circuit IC includes a change-over switch 91 and an AND gate 92. The change-over switch 91 includes a terminal X supplied with the MSB of the video signal $V_O$ or $V_T$ from the CCU processing unit 7, a terminal Y supplied with the replacement data of level "1", an output terminal Z and a control terminal S connected to the output of the AND gate 92. The AND gate 92 is supplied with the indication signal C and the control signal B.

With this configuration, assume that the indication signal C is at high level and the range indication control signal B is also at high level. Then, the AND gate 92 outputs a high-level signal, and switches the output terminal Z of the change-over switch 91 from the input terminal X to the input terminal Y, so that the MSB of the LSB-replaced video signal $V_T$ is replaced by a predetermined brightness data of level "1" and output it as the processing range check video signal $V_{TS}$. In the case where at least one of the indication signal C and the range indication control signal B is at low level, on the other hand, the AND gate 92 outputs a low-level signal and turns the output terminal Z of the change-over switch 91 to the input terminal Y thereby to produce the 10-bit video signal $V_O$ or $V_T$ as it is.

This pixel data replacing unit 9 thus is controlled by the range indication control signal B. First, when the signal B is at a low level, the video signal $V_O$ produced from the CCU processing unit 7 is output as it is.

When the range indication control signal B is at a high level, on the other hand, the respective pixels of the video signal $V_T$ is converted into the replacement data in accordance with the indication signal C output from the LSB extractor 6 serving as a switching signal (key signal) for synthesizing the video signal indicating the FTC processed image range. Specifically, as long as the indication signal C is in on state, the brightness level of each pixel of the video signal $V_T$ is replaced with a predetermined value such as 100% brightness, and the video signal $V_T$ is converted into and output as the processing range check video signal $V_{TS}$.

According to this embodiment, therefore, the FTC processing range indispensable for FTC adjustment is indicated by the operation of the LSB replacing unit 5 of the head unit 1, the LSB extractor 6 of the CCU 3 and the pixel data replacing unit 9 in accordance with the range indication control signal B supplied from the controller 10.

In this case, the LSB replacing unit 5 replaces the least significant bit signal of the original video signal $V_O$ constituting the least significant bit (LSB) portion of the digital video signal with the replacement data in accordance with the indication signal C output from the head processing unit 4.

In this way, the video signal VT with the least significant bit thereof replaced by the indication signal C is sent to the CCU 3 by the transmission unit 2.

Only as long as the range control indication signal B remains at high level, the LSB extractor 6 extracts the indication signal C from the least significant bit portion of the video signal $V_T$ and supplies it to the pixel data replacing unit 9.

The pixel data replacing unit 9 changes the pixel data corresponding to the video signal $V_T$ into a data of a predetermined level in accordance with the indication signal C, whereby in the presence of the indication signal C, the processing range check video signal $V_{TS}$ is produced as replaced into a signal of predetermined level with 100% brightness by pixel.

When the range control indication signal B is at low level, the original video signal $V_O$ is output directly from the pixel data replacing unit 9, so that an image derived from the video signal $V_O$ is displayed on the monitor, thereby securing a normal monitor function (see FIG. 12).

When the range control indication signal B is at high level, on the other hand, the processing range check video signal $V_{TS}$ is output on a monitor (not shown), displays an image with the FTC-processed image portions uniformly having a maximum brightness (see FIG. 12). The range to be subjected to the FTC processing can thus be easily checked.

In this case, the CCU processing unit 7 is always supplied with the video signal $V_O$ or the video signal $V_T$. Even during the checking of the range to be processed, therefore, the original video signal $V_O$ or the video signal $V_T$ substantially equivalent to the video signal $V_O$ can be supplied as a main video signal only with a slight deterioration of image quality (see FIG. 12).

Thus, according to this embodiment, the CCU 3 can produce the processing range check video signal $V_{TS}$ from the video signal $V_T$. As a result, the original video signal $V_O$ or $V_T$ and the processing range check video signal $V_{TS}$ can be produced independently of each other in the CCU 3 without using any cable other than the main video line. Even during the on-air operation, therefore, the FTC processing can be performed arbitrarily, thereby always producing a high-quality image easily.

As described above, according to this embodiment, the indication signal for the range to be processed is transmitted using the least-significant-bit transmission system of the main video line substantially without any effect on the original video signal thereby to produce a processing range check video signal at the CCU. The flesh tone DTL adjustment can thus be carried out while checking the processing range even during the on-air operation without substantially affecting the video output on the main line.

The required adjustment operation can thus be accomplished, and a camera system always capable of holding a high image quality is easily provided.

Now, a television camera apparatus having the chroma key processing function according to the present invention will be explained with reference to the block diagram of FIG. 8 showing an example configuration as another example of image signal processing. In FIG. 8, the component parts having the same function as the corresponding ones in FIG. 4 will be designated by the same reference numerals and will not be described any further.

The camera head unit 1 includes image pickup devices 104, 105, 106 of three colors of R, G and B. The outputs of these devices are applied to analog video signal processing circuits 107, 108, 109, respectively, and amplified or otherwise processed therein. After that, A/D (analog to digital) converters 110, 111, 112 convert the signals into digital signals. Further, the signals are subjected to various image signal processes including the gamma correction in the digital video signal processing circuit 13.

The R, G, B signals processed in the digital video signal processing circuit 113 is divided into two groups, one being input to a matrix circuit 114 for synthesis of the luminance/color difference signal, and the other input to chroma key signal generating circuit 115.

The matrix circuit 114 is for converting the format of the video signal. A converter according to this embodiment is preferably of a type for converting the format of the digitized R, G, B video signals into the luminance signal/color difference signal format or the composite signal format. In the case under consideration, however, it is assumed to use a converter of a type for converting the format of the R, G, B video signal into the format of the luminance/color difference signal.

The digital RGB signal input from the digital video signal processing circuit 113 to the matrix circuit 114 is processed in the matrix circuit 114 and a color-signal low-pass filter (LPF) 117 and thus converted into a digital video signal of the luminance/color difference transmission scheme with the bandwidth of the color difference signal narrower than that of the luminance signal, and then applied to a P-S conversion circuit 119.

In the case where the transmission scheme in the format of a composite signal or the transmission scheme in the format of component signals is used, on the other hand, the output signal of the LPF 117 is further processed in an encoder 118 and applied to the P-S conversion circuit 119 as a digital video signal V.

A chroma key signal ck is generated, on the other hand, from the digital RGB signal input from the digital video signal processing circuit 113 to the chroma key signal generating circuit 115. The signal for imaging processing, or more specifically, the chroma key signal for indicating the image processing will be briefly described below.

Figure 9:
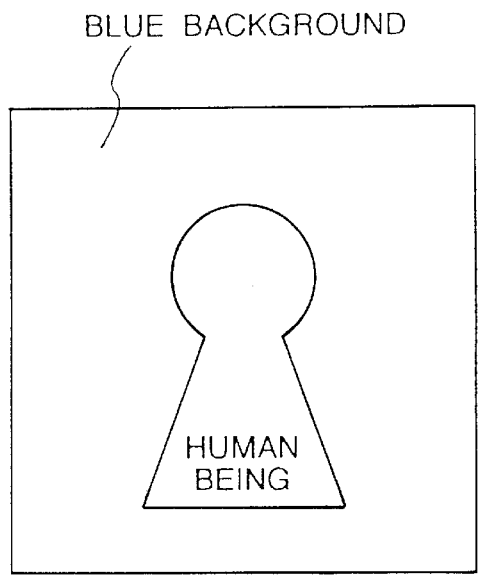
FIG. 9 is a diagram for explaining the chroma key processing according to the embodiment of FIG. 8.

The chroma key signal is used for synthesizing two images. A part of one of the images is extracted and inserted into the other image by use of the chroma key signal constituting an image signal switching signal. As shown in FIG. 9, an image portion such as a human being to be extracted is imaged with a blue background, for example, in which case the chroma key signal is a timing signal indicating the period during which the video signal associated with the background is produced. Thus a 1-bit signal is produced which is reduced to "0" for the background portion, and assumes "1" for the other portions.

The chroma key signal, therefore, can be produced by comparing the hue of the video signal obtained by calculating the magnitude and the ratio between the R, G, B levels from the digitized video signal with the hue (blue in FIG. 9 as the background is involved) designated by an external operation.

Figure 10:
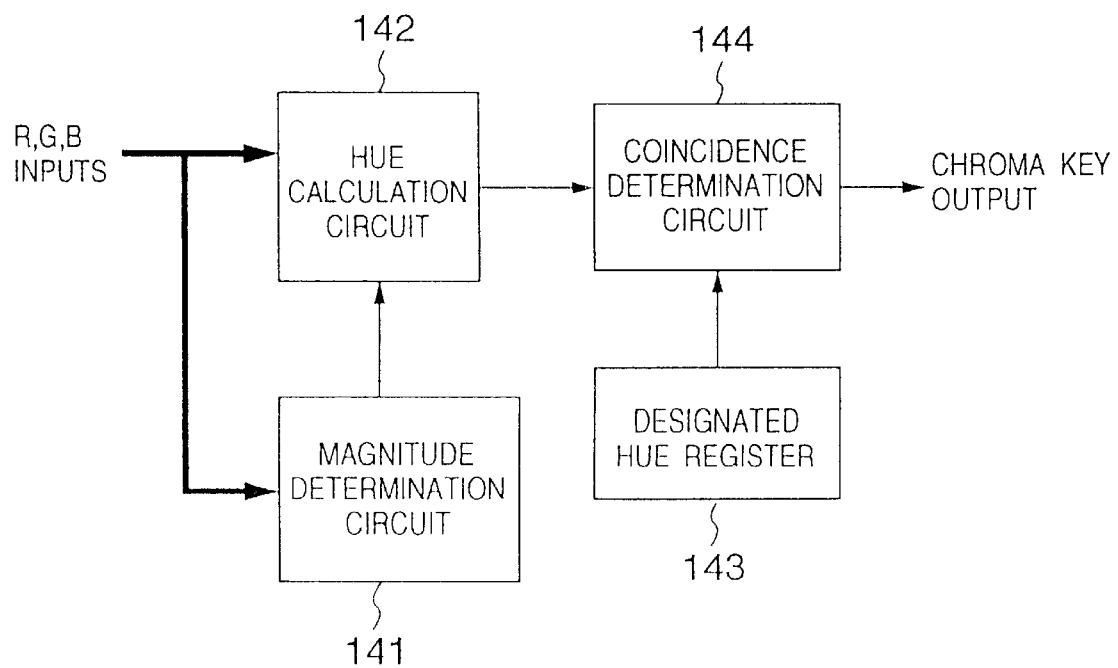
FIG. 10 is a block diagram showing an example of a chroma key signal generating circuit according to the embodiment of FIG. 8.

FIG. 10 shows an example of a chroma key signal generating circuit 115. In this embodiment, the chroma key signal generating circuit 115 includes a magnitude determination circuit 141 for determining relative sizes of the signals of R, G, B, a hue calculation circuit 142 for calculating the hue from the relative sizes of the R, G, B signals, a designated hue register 143 for storing the hue data set from an external source, and a coincidence determination circuit 44 for comparing the calculated hue of the video signal with the set hue and determining a coincidence. The coincidence determination circuit 144 outputs a chroma key signal having the same sample grade as the video signal.

Returning to FIG. 8, the chroma key signal ck produced from the chroma key signal generating circuit 115 is directly input from the digital video signal processing circuit 113 and generated from the R, G, B signals with a wide band. A very high accuracy can thus be easily maintained.

The chroma key signal ck produced from the chroma key signal generating circuit 115 is also applied to the P-S conversion circuit 119.

The P-S conversion circuit 119 has the function of converting parallel data into serial data. The P-S conversion circuit 119 according to this embodiment is supplied with the digital video signal V in parallel and configured to replace the least significant digit (LSB) data of the digital video signal V with the chroma key signal ck. These parallel input data are converted into serial data and output.

Specifically, the chroma key signal ck, as described above, is a one-bit signal representing the background portion and the remaining portion. The P-S conversion circuit 119 replaces the signal ck with the LSB of one of the luminance signal and the color difference signal of the video signal V (or the least significant bit LSB of the composite signal) and converts it into a serial signal.

The serial signal thus obtained makes up a serial video signal V+ck, i.e., a chroma key replacement video signal, multiplexed with the least significant bit of the digital video signal V replaced by the chroma key signal ck.

This video signal signal V+ck is transmitted through the camera cable 2x (constituting the main video line of the transmission unit 2) to the CCU 3.

The CCU 3 restores the serial video signal V+ck transmitted thereto through the camera cable 2x into a parallel signal through a S-P (serial-parallel) conversion circuit 120 thereby to produce a video signal V including parallel data. At the same time, the least significant bit LSB is separated and supplied to the chroma key signal output circuit 121.

The chroma key signal output circuit 121 converts the 1-bit LSB data into a predetermined level and outputs it after processing it as required by adding a video sync signal or the like.

As a consequence, the digital video signal V is output from the CCU 3. The chroma key signal ck can be produced from the CCU 3, on the other hand, without increasing the transmission channels of the camera cable 2x.

A digital TV camera of high image quality for broadcasting or the like applications commonly employs a scheme for processing the video signal with a 10-bit tone accuracy. In such a case, according to the above-mentioned embodiment, the tenth bit data of the digital video signal V constitutes the least significant bit LSB and is replaced with the chroma key signal ck.

In the case where the transmission scheme is the luminance/color difference type, the bit thus replaced is the tenth bit of the data of the luminance signal or the color difference signal. For the composite scheme, on the other hand, it is simply the tenth bit data.

When the video signal bit is replaced by the chroma key signal in this way, the resolution along the tone direction of the video signal transmitted is naturally reduced for a deteriorated resolution. If the tone accuracy is as much as ten bits, however, the deterioration of the resolution due to the replacement of the LSB is not a serious problem. The problem is further lessened and substantially no practical problem is posed when the least significant bit of the color difference signal is used for the luminance/color difference scheme.

According to this embodiment, therefore, in spite of the employment of a transmission scheme such as the luminance/color difference scheme or the composite scheme low in transmission rate, the chroma key signal ck generated from wide-band R, G, B signals can be produced as an output of the chroma key signal output circuit 121 without increasing the transmission channels of the camera cable 2x. The CCU 3 can thus produce a digital video signal output of a required image quality and a high-accuracy chroma key signal, thereby easily meeting a sophisticated specification with low cost.

Now, a modification of this embodiment will be explained.

FIG. 11 shows a modification of this embodiment, which is different from the embodiment of FIG. 8 in that this embodiment further comprises a selector 122 for performing the switching operation in response to a select instruction input from an external source by a predetermined operation. As a result, the process of replacing the least significant bit LSB of the digital video signal V by the chroma key signal ck can be turned on/of, while the remaining configuration is the same as the embodiment of FIG. 8.

The selector 122 is a switching circuit of two-input one-output type, and has one of the input terminals thereof supplied with the chroma key signal ck from the chroma key signal generating circuit 115, and the other input terminal thereof supplied with the data $V_{LSB}$ of the least significant bit LSB of the digital video signal V output from a low-pass filter 117 or an encoder 118. One of these two inputs is selected by a select signal supplied thereto from an on/off switch 130, for example, and supplied to the least significant bit LSB portion of the P-S conversion circuit 119. The switch 130 can be mounted on either the camera head unit 1 or the CCU 3.

If the input to the selector 122 is switched to the chroma key signal side by a predetermined select signal such as a high-level "1" signal, the chroma key signal ck is applied to the least significant bit LSB portion of the P-S conversion circuit 119. As in the embodiment shown in FIG. 8, therefore, the CCU 3 produces a high-accuracy chroma key output and a digital video signal output of the required image quality.

In the case where the chroma key signal is not required by reason of the TV camera operation, for example, the select signal is turned to low level "0" for the selector 122 and the input thereto is switched to the data $V_{LSB}$ side. Then, all the bits of the digital video signal V, including the least significant bit LSB data $V_{LSB}$, are transmitted to the CCU 3. As a result, a digital video signal of high image quality not reduced in quantization accuracy due to the lack of bit data can be output from the CCU 3.

According to the modification of FIG. 11, therefore, a TV camera apparatus of a further sophisticated specification can be provided.

According to this embodiment, a high-accuracy chroma key signal output can be produced from the CCU without transmitting the wide-band R, G, B signals from the camera head unit to the CCU. Consequently, the luminance/color difference scheme or the composite signal scheme can be selected as a transmission method of the digital video signal between the camera head unit and the CCU, thereby reducing the transmission rate. Thus the camera apparatus can be reduced in cost, power consumption and improved in stability. A multi-purpose television camera apparatus of high-class specification can thus be easily produced.

The foregoing description refers to the chroma key signal and the indication signal indicating the range of the FTC processing which is multiplexed and transmitted in a form replaced with the least significant bit of the digital video signal. The present invention, however, is not limited to the type of the signal transmitted by being multiplexed and replaced with the LSB of a digital video signal, but is applicable to any type of signal with equal effect.

Applicable signals include, for example, a signal representing a video level or a hue generated by the camera head or other signals for imaging. These signals can also be transmitted to the CCU without any special transmission channel of the camera cable.

In the above-mentioned embodiments, the least significant bit data of the digital video signal to be transmitted from the head unit 1 to the CCU 3 is replaced by another signal data (C or ck) and transmitted to the CCU 3 through the transmission unit 2. The data which is replaced with another signal data, however, is not limited to the least significant bit of the digital video signal, but another bit can be used for the same purpose.

Also, the first and second embodiments described above can be combined so that two different signal data C and CK are transmitted from the head unit 1 to the CCU 3. In such a case, the data of the two least significant bits of the digital video signal can be replaced by the two different signal data and can be transmitted to the CCU 3 through the transmission unit 2.

Further, in the case where the different signal data to be transmitted together with the digital video signal from the head unit 1 to the CCU 3 is comprised of a plurality of bits, the data of a plurality of the least significant bits of the digital video signal can be replaced with the different signal data.

What is claimed is:

1. A television camera apparatus, comprising:
    a camera head unit which images an object and generates a digital video signal of said object image;
    a transmission unit which transmits said digital video signal from said camera head unit; and
    a camera control unit which processes said digital video signal transmitted from said camera head unit through said transmission unit;
    wherein said camera head unit includes:
        a first signal generator which generates a first signal for image processing from the digital signal of said object image, and
        a replacing unit which replaces the least significant bit data of the digital video signal of said object image with said first signal to thereby obtain a replacement video signal and transmitting the replacement video signal to said transmission unit; and
    wherein said control unit includes an extraction unit which extracts the least significant bit data from said replacement video signal transmitted from said camera head unit through said transmission unit to thereby obtain said first signal,
    wherein said camera head unit generates R, G, B video signals as said digital video signals, and said camera head unit further includes a chroma key signal generator which generates said first signal as a chroma key signal from each of said R, G, B video signals, and applies the signal thus generated to said replacing unit.

* * * * *